(12) United States Patent
Bueche et al.

(10) Patent No.: US 8,179,936 B2
(45) Date of Patent: May 15, 2012

(54) GAS-COOLED LASER DEVICE

(75) Inventors: Dirk Bueche, Fanas (CH); Hagen Zimer, Jena (DE); Carsten Ziolek, Seewis-Dorf (CH)

(73) Assignee: Trumpf Laser Marking Systems AG, Gruesch (CH)

( * ) Notice: Subject to any disclaimer, the term of this patent is extended or adjusted under 35 U.S.C. 154(b) by 0 days.

(21) Appl. No.: 12/138,932

(22) Filed: Jun. 13, 2008

(65) Prior Publication Data
US 2009/0046752 A1 Feb. 19, 2009

(30) Foreign Application Priority Data
Jun. 14, 2007 (EP) ..................................... 07011678

(51) Int. Cl.
*H01S 3/04* (2006.01)
(52) U.S. Cl. ................. 372/36; 372/34; 372/55
(58) Field of Classification Search ............... 372/34, 372/36, 55
See application file for complete search history.

(56) References Cited

U.S. PATENT DOCUMENTS
| | | | |
|---|---|---|---|
| 5,901,167 A | 5/1999 | Sukhmann et al. | |
| 6,330,155 B1 | 12/2001 | Remsburg | |
| 2004/0179570 A1 | 9/2004 | Vitruk et al. | |
| 2005/0123011 A1 | 6/2005 | Sukhmann et al. | |
| 2005/0254537 A1* | 11/2005 | Su et al. | 372/43.01 |
| 2006/0077354 A1* | 4/2006 | Goik et al. | 353/57 |

FOREIGN PATENT DOCUMENTS
| | | |
|---|---|---|
| EP | 1324440 | 7/2003 |
| JP | 1195269 A | 4/1999 |
| JP | 2005166735 | 6/2005 |

OTHER PUBLICATIONS

European Search Report from corresponding European Patent Application No. 07011678.5, mailed Jul. 26, 2007, 6 pages.
Standards CE and IEC Classifications, by Hoffmann Enclosures, a Pentair Company, http://www.ipc.com.mx/pdf/clasificacion-ip.pdf, 2 pages, 2003.

* cited by examiner

*Primary Examiner* — Yuanda Zhang
(74) *Attorney, Agent, or Firm* — Fish & Richardson P.C.

(57) ABSTRACT

A gas-cooled laser device includes heat dissipative components, and housing walls made of a heat conducting material, in which one or more of the housing walls are provided with ventilation channels. At least one heat dissipative component is mounted on a plate of a heat conducting material, and the heat conducting plate is connected in a thermally conducting manner with the at least one housing wall that is provided with ventilation channels. The heat dissipative components can include heat dissipative optical components and heat dissipative non-optical components that are respectively arranged on different sides of the plate or are respectively arranged in different compartments on one side of the plate.

16 Claims, 3 Drawing Sheets

GAS-COOLED LASER DEVICE

CROSS REFERENCE TO RELATED APPLICATION

This application claims priority under 35 U.S.C. §119(a) to European Application No. 07 011 678.5-2222, filed on Jun. 14, 2007, the entire contents of which are hereby incorporated by reference.

TECHNICAL FIELD

The present invention relates to a gas-cooled laser device with dissipative optical and dissipative non-optical components.

BACKGROUND

In many fields of industrial laser material machining there exists the desire to have compact laser devices, in which the waste heat is transferred by means of simple gas or air cooling. In comparison to the water cooling that is often used, gas or air cooling has the advantage that the number of components involved in the cooling circuit can be significantly less, and as a result, the risk of failure of the laser device can be dramatically reduced. For the laser beam source of the laser device, air cooling signifies the elimination of potential water leakages, and therefore reliability of the laser device can be increased with air cooling.

In water-cooled laser devices, the laser beam source is located in a laser head and its power supply unit is located in a separate power supply device, in which a central cooling unit is also located. The power dissipated in the laser head, together with the power loss occurring in the power supply device, is transferred by means of a water circuit to the cooling unit and is there delivered up to the surroundings through a heat exchanger. In the water cooling for this configuration there is usually only a single location at which heat exchange takes place, namely at the power supply device. Since water is a relatively good heat transfer medium due to its thermal capacity, the heat can be transferred very efficiently from the laser head and its build volume can be configured to be correspondingly compact.

In comparison with this system convective heat removal from the laser head by means of gas or air is fundamentally less efficient, in spite of its advantages with regard to its compactness. In air-cooled laser equipment, conventional ribbed metal cooling elements with a high heat transfer resistance can be used. These cooling elements usually have only a single cooling surface and a large build volume. However, the large build volume and the constrained options for installing these cooling elements limit the compactness of the laser head and restrict the design options substantially. The use of commercial cooling elements for the laser head usually inhibits cooling efficiency on the one hand, and compactness and design freedom.

SUMMARY

In one general aspect, a gas-cooled laser device includes heat dissipative components, and housing walls made of a heat conducting material, in which one or more of the housing walls are provided with ventilation channels. At least one heat dissipative component is mounted on a plate of a heat conducting material, and the heat conducting plate is connected in a thermally conducting manner with the at least one housing wall that is provided with ventilation channels.

Implementations can include one or more of the following aspects. For example, the heat dissipative components can be mounted on either side or both sides of the plate.

The heat conducting plate can be arranged between two housing walls provided with ventilation channels and can be connected to the two housing walls in a thermally conducting manner.

The gas-cooled laser device can include one or more compartments provided on one side of the plate, or on both sides of the plate, in which the compartments are bounded by the plate.

The heat dissipative components can include heat dissipative optical components and heat dissipative non-optical components that are respectively arranged on different sides of the plate or are respectively arranged in different compartments on one side of the plate.

The ventilation channels can extend within the housing wall. The ventilation channels of a housing wall can be formed by a series of parallel channels. The ventilation channels can have a geometry such that a gas flow passing through them reaches its maximum flow velocity in the region of the plate.

The plate and one or more housing walls provided with ventilation channels can be connected together with a material fit. The plate and one or more housing walls provided with ventilation channels can be manufactured out of one piece. The plate and two housing walls opposite each other can form an H or a U-shaped cross-section. The plate can be at least as thick as a housing wall provided with ventilation channels.

The ventilation channels of each housing wall can be connected to a fan through at least one distribution channel extending transversely to the ventilation channels. The gas-cooled laser device can also include a fan to which the ventilation channels are fluidly connected.

The at least one heat dissipative component can be an optical component. The at least one heat dissipative component can be a non-optical component. The heat conducting material of the plate can be a metal.

In another general aspect, a method of cooling a laser device includes providing one or more heat conducting housing walls with ventilation channels, directly mounting at least one heat dissipative optical component and at least one heat dissipative non-optical component on a plate made of a heat conducting material such that heat from the components dissipate into the heat conducting plate, and connecting in a thermally conductive manner the heat conducting plate with at least one housing wall such that the heat from the heat dissipative components is directed through away from the heat conducting plate, through the heat conducting walls, and through the ventilation channels.

The cooling is more efficient for a gas-cooled laser device by a simple implementation of at least the IP-54 class of protection, and enables an even more compact construction. At least one heat dissipative component, preferably at least one heat dissipative optical component and at least one heat dissipative non-optical component, particularly preferably all heat dissipative components, are mounted on a plate of a heat conducting material, in particular, of a metal, which is connected in a thermally conducting manner with the at least one housing wall provided with ventilation channels. In operation the ventilation channels are connected to a fan, which preferably is arranged in the laser device.

An advantage of the invention consists in that the dissipative optical components of a laser beam source, where such dissipative optical components include, e.g., a Q-switch, a laser crystal, and a beam dump, and the dissipative electronic power components of the laser beam source are mounted on the same plate, and in that the heat transferred from these dissipative components into the plate is very efficiently conducted outwards by way of and through the plate to the gas-cooled housing walls. The dissipative components can be mounted on either side of the plate or on both sides of the plate.

In some embodiments, the plate is attached in a thermally conducting manner to at least one housing wall provided with ventilation channels, in particular, it is arranged between two housing walls provided with ventilation channels and is attached to these in a thermally conducting manner, so that the heat transferred from the dissipative components into the plate is directly conducted into the gas-cooled housing walls.

Preferably dissipative optical components and dissipative non-optical components are respectively arranged on different sides of the plate and/or respectively in different compartments, which are provided on the same side of the plate and are bounded by the plate.

In other embodiments, the ventilation channels extend within the housing wall. This internally guided air cooling of the housing walls enables a particularly compact construction with, at the same time, implementation of higher IP (ingress protection) classes of protection (for example, protection against contact and infiltration of water and dirt), e.g., IP-54 and higher classes can be implemented, and furthermore results in a homogeneous temperature distribution in the laser housing. Moreover a laser device fitted in this manner is stable with respect to varying ambient conditions and can be erected in any orientation. In addition ventilation channels can also run within the plate, these likewise being connected to the fan.

The geometry of the ventilation channels can be such that a gas or air flow flowing through the channels reaches its maximum flow velocity in the region of the plate, so as to transfer heat out of the plate efficiently. To this end the ventilation channels can, for example, be configured in the form of a venturi nozzle. The gas or air flows can be adjusted to be either laminar or turbulent.

The plate and, in particular, the housing walls provided with ventilation channels can in each case be separate walls that are joined together to form the housing, or can be manufactured out of a single piece of metal. The plate and two walls opposing each other, in particular provided with ventilation channels, can advantageously form an H or U-shaped cross-section. Such an H-shaped cross-sectional structure can, e.g., be manufactured from an aluminum cuboid shape, into which a larger hollow cavity is milled from each of two sides opposing one another. Here the one hollow cavity can form an optics compartment for the optical components (e.g., the laser resonator and the beam shaper) of the laser beam source and the other hollow cavity can form a power supply compartment for a power supply unit of the laser beam source. All the dissipative components of the laser device are preferably mounted on the central plate common to the two compartments of this H-shaped cross-sectional structure. Further advantages of the H-shaped cross-sectional structure are the torsional stiffness of the whole laser housing that accompanies this shape, and the homogeneous temperature distribution in the laser housing.

Further advantages of the invention can be extracted from the claims, the description and the drawing. The features mentioned above and below may be used individually or collectively in arbitrary combination. The embodiment shown and described is not to be understood as exhaustive enumeration but has exemplary character for describing the invention.

DETAILED DESCRIPTION

Figure 1A:
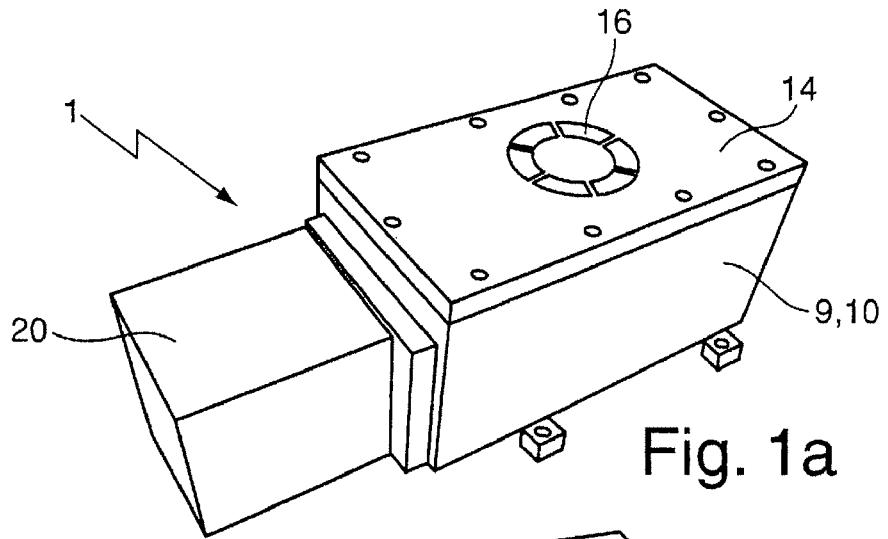
FIGS. 1a and 1b are top perspective views of a laser device with a cover closed and with the cover removed, respectively.
Figure 1B:
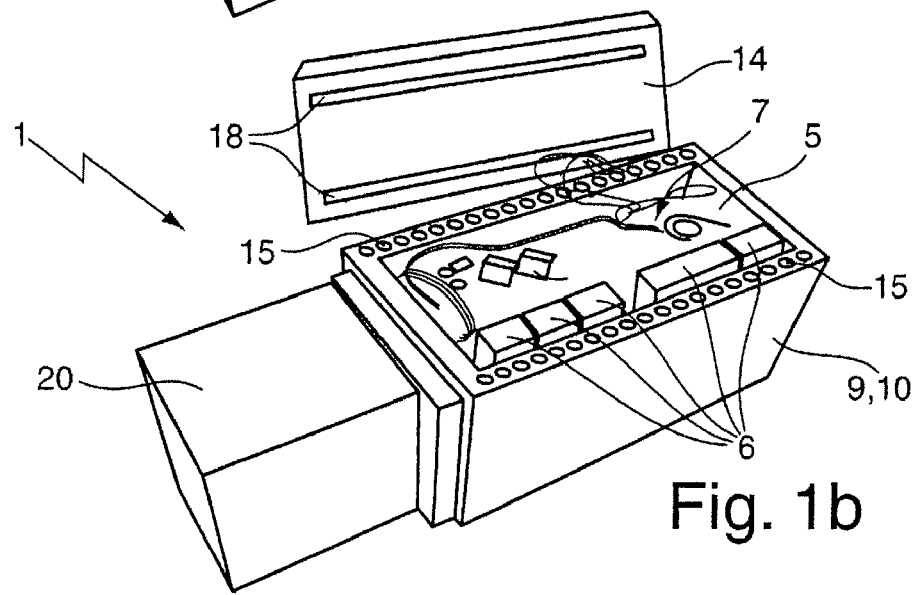
Figure 1C:
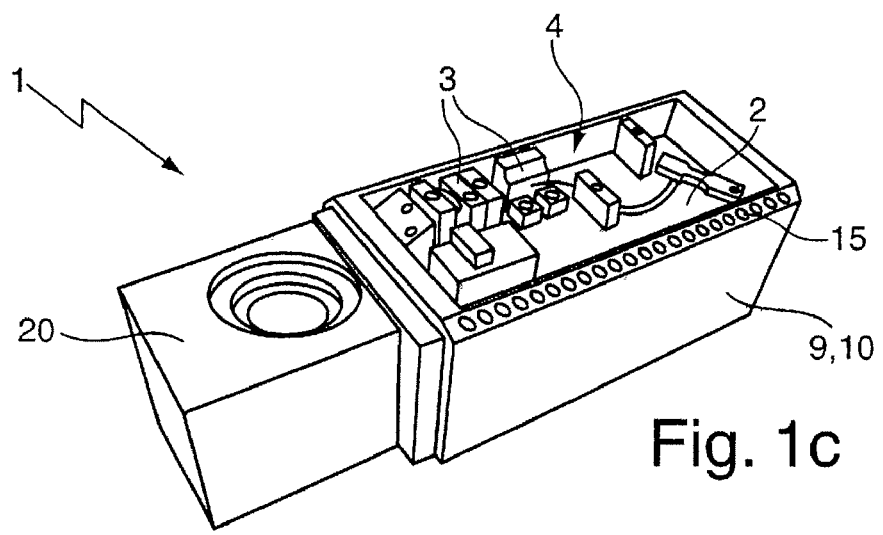
FIG. 1c is a bottom perspective view of the laser device of FIGS. 1a and 1b with a base removed.
Figure 2:
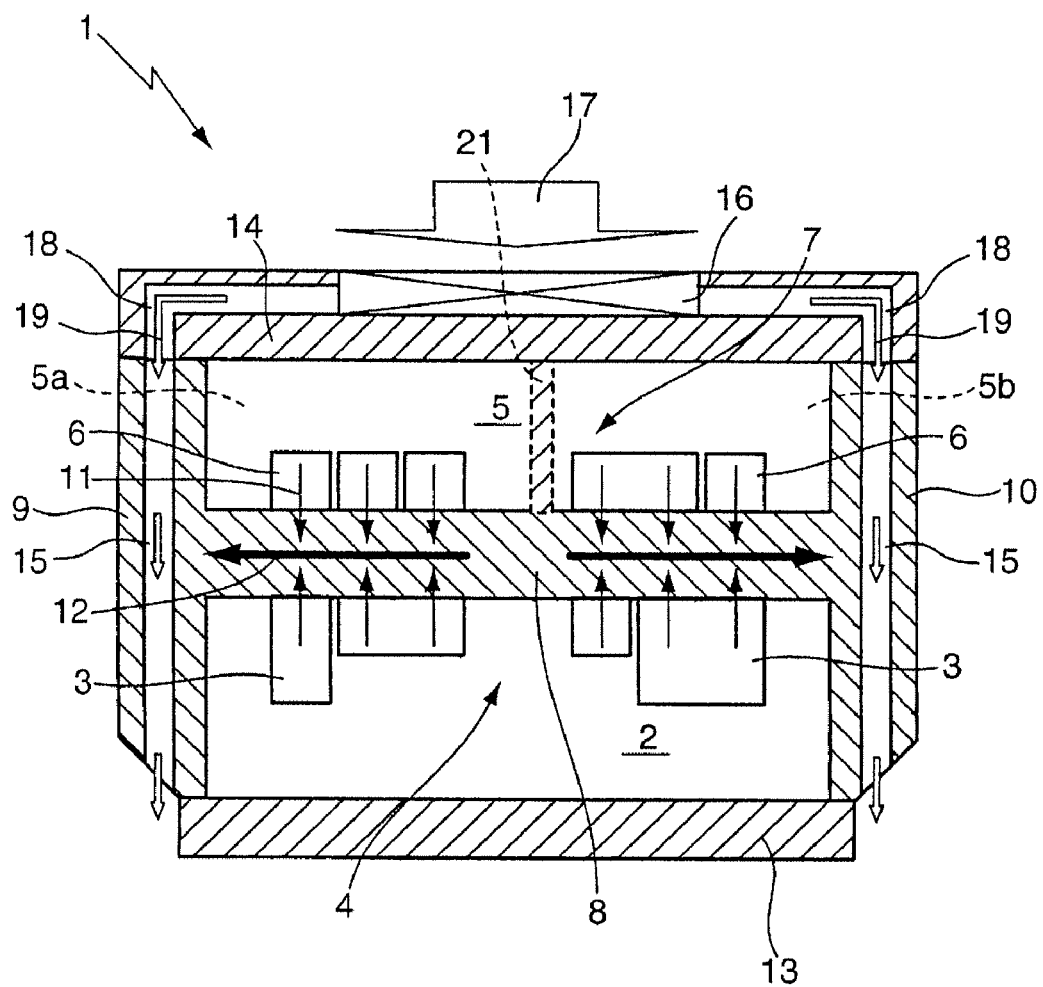
FIG. 2 is a cross-sectional view the laser device of FIGS. 1a-1c.

The laser device 1 shown in FIGS. 1a-2 has a lower optics compartment 2, in which are arranged all the optical components 3 of a laser beam source 4, and an upper power supply compartment 5, in which are arranged all the electronic power components 6 of a power supply unit and/or control unit (electronics) 7 for the laser beam source 4. In the embodiment shown, the laser beam source 4 is a diode-pumped solid-state laser (e.g., Nd:YAG or Nd:YVO$_4$), whose optical components 3, such as, e.g., a laser resonator with an output mirror, a rear mirror, and a laser crystal arranged between them, also, if necessary, a Q-switch, a beam dump, and a beam shaper, are arranged in the optics compartment 2.

The optics compartment 2 and the power supply compartment 5 are separated from one another by a common partition wall (a plate) 8, which is arranged between two side walls 9, 10 of the optics compartment 2 and the power supply compartment 5 and is attached to the side walls 9, 10 in a thermally conducting manner. On the underside of the common partition wall 8 are mounted at least all the heat dissipative optical components 3 of the laser beam source 4, thus, e.g., a Q-switch, a laser crystal, and a beam dump, and on the upper side are mounted at least all the heat dissipative electronic power components 6, each of which is in thermal contact with the plate 8. All the dissipative optical components 3 and the dissipative electronic components 6 are preferably mounted on the common partition wall 8. The heat transferred (as shown by heat flow arrows 11) from the dissipative components 3, 6 into the common partition wall 8 is very effectively conducted outwards (as shown by heat flow arrows 12) through the partition wall 8 to the air or gas-cooled side walls 9, 10. The common partition wall 8 and the side walls 9, 10 are made of a heat conducting material, for example, a metal such as aluminum.

In some implementations, the partition wall or plate 8 is connected with the housing walls 9, 10 with a material fit in which the partition wall 8 and the housing walls 9, 10 are either welded together or are manufactured out of one piece, which is in contrast to two pieces connected to each other by using, for example, screws. Thus, for example, the common partition wall 8 and the side walls 9, 10 of the two compartments 2, 5 can be manufactured out of one piece of metal, e.g., from an aluminum cuboid shape, into which a larger hollow cavity has been milled from each of two sides, as a result of which this milled part has an H-shaped cross-section (as shown in FIG. 2) with the common partition wall 8 as a central plate. The lower cavity forms the optics compartment 2 for the laser resonator and the beam shaper and is closed off with a base plate 13, while the upper cavity forms the power supply compartment 5 for the power supply and/or control device 7 and is closed off with a cover plate 14. A further advantage of the H-shaped cross-section is that it increases the torsional stiffness of the whole housing.

Within the two side walls 9, 10 opposing one another run vertical ventilation channels 15, which in each case are formed by a series of continuous parallel vertical holes. The ventilation channels 15 can have a geometry such that air or gas flow through the channels reaches its maximum flow velocity in the region of the plate 8. Thus, for example, the ventilation channels 15 can be configured in the shape of a venture tube that includes a constricted section near the plate 8. Moreover, the air or gas flow through the channel 15 can be adjusted to be either laminar or turbulent flow.

A fan 16, preferably designed as a radial fan, is located in the cover plate 14, which fan sucks in air or another gas (as indicated by an air/gas flow arrow 17). The ventilation channels 15 of each of the two side walls 9, 10 are in each case connected to the fan 16 through a distribution channel 18 that extends through the cover plate 14 in a direction that is transverse to the direction the ventilation channels 15 extend and that opens in the downward direction. The air or gas sucked in by the fan 16 is pushed through the distribution channels 18 into the ventilation channels 15 (as indicated by air/gas flow arrows 19), is heated in the ventilation channels 15 from the heat released by the components 3, 6, and the heat exits finally at the lower end of the side walls 9 through air exit slots. In other words, the heat transferred from the two compartments 2, 5 into the common partition wall 8 is transferred away through the internally guided air cooling in the side walls 9, 10. For optimal or improved conduction of heat, the common partition wall 8 should be approximately as thick as the side walls 9, 10, including the ventilation channels 15, of the optics compartment 2 and the power supply compartment 5.

As shown in FIGS. 1a-1c, the laser device 1 also includes an optical attachment 20 for focusing and/or deflecting the laser beam generated in the optics compartment 2 and decoupled from the optics compartment 2 by way of an output mirror.

As indicated in FIG. 2 by the dashed lines, the power supply compartment 5 can, e.g., be subdivided by a partition wall 21 into at least two separate compartments 5a, 5b.

Figure 3:
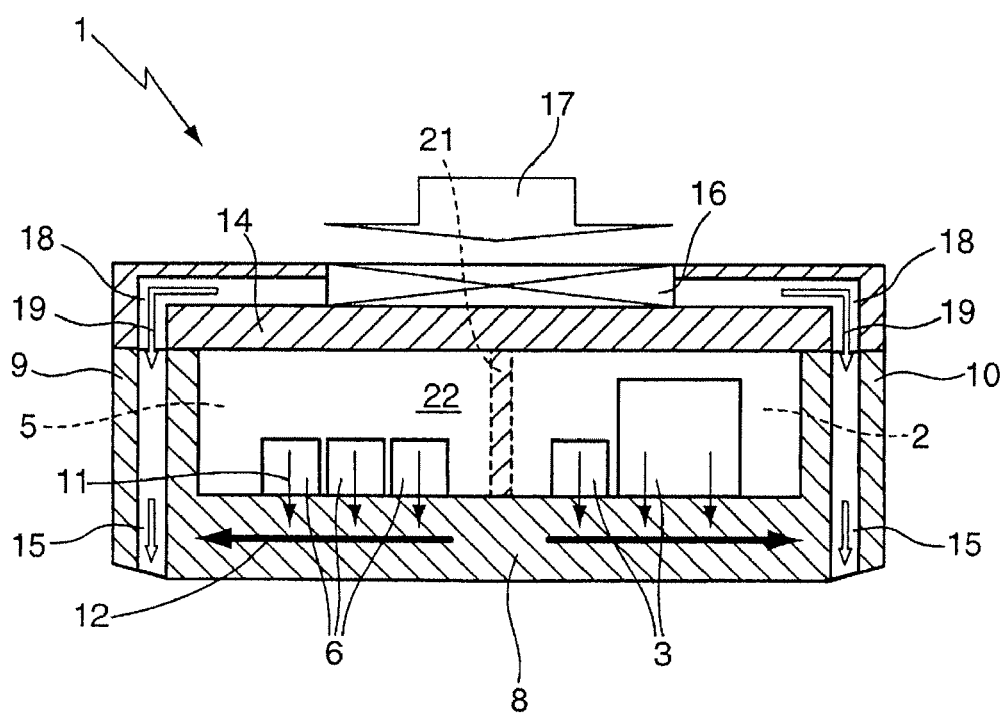
FIG. 3 is a cross-sectional view of another implementation of the laser device of FIGS. 1a-1c.

The laser device 1 shown in FIG. 3 differs from the laser device of FIGS. 1 and 2 simply in that here the common partition wall 8 and the two side walls 9, 10 provided with ventilation channels 15 form a U-shaped cross-section. This U-shaped cross-sectional structure can be manufactured out of one piece of metal, e.g., from an aluminum cuboid shape, into which a larger hollow cavity has been milled from one side, as a result of which this milled part has a U-shaped cross-section with the common partition wall 8 as a base plate. All heat dissipative optical and electronic components 3, 6 are arranged on the inner side of the common partition wall 8, and, in particular, either in a common compartment 22, or, as indicated by the dashed lines, each in separate compartments 2, 5, which are separated from one another by a partition wall 21.

In summary, the laser device according to the invention has a compact housing with an integrated air or gas cooling system, which allows cooling of the laser device independent of orientation, which enables a simple implementation of at least an IP-54 class of protection, which generates a homogeneous temperature distribution in the laser housing, and which renders the laser device insensitive to varying ambient conditions such as varying temperature, moisture, and convection. This is of particular importance for an industrial laser device, since the actual laser beam source is decoupled by means of the integrated air cooling system from thermal ambient influences, such as, e.g., the thermal deformation of a resonator plate. Thus, the specified laser parameters of the laser device can be maintained, even with differing ambient conditions. The housing of the laser device is accordingly multifunctional, since it is at the same time a cooling element, an attachment platform for various optical and electronic components, and provides a boundary between the interior of the housing and the ambient conditions.

Other implementations are within the scope of the following claims.

For example, in other implementations, the lower cavity forms the power supply compartment 5 and the upper cavity forms the optics compartment 2.

What is claimed is:

1. A gas-cooled laser device comprising:
   heat dissipative optical components;
   a first housing wall made of a heat conducting material, the first housing wall being provided with first ventilation channels that extend within the first housing wall, each of the first ventilation channels having a length that is greater than the thickness of the first housing wall;
   a second housing wall made of a heat conducting material, the second housing wall being provided with second ventilation channels that extend within the second housing wall, each of the second ventilation channels having a length that is greater than the thickness of the second housing wall;
   wherein the heat dissipative optical components are mounted on a plate of a heat conducting material, and the plate is arranged between the first and second housing walls and is directly connected to the first and second housing walls in a thermally conducting manner; and
   wherein heat dissipated by the heat dissipative optical components is conducted away from the plate to the housing walls, and the first and second ventilation channels extend within the first and second housing walls respectively, so as to convey heat, dissipated by the heat dissipative optical components, away from the housing walls.

2. The gas-cooled laser device of claim 1, further comprising one or more compartments provided on one side of the plate, or on both sides of the plate, in which the compartments are bounded by the plate.

3. The gas-cooled laser device of claim 1, further comprising heat dissipative non-optical components mounted on the plate, wherein heat dissipated by the heat dissipative non-optical components is conducted away from the plate to the housing walls, and the heat dissipative optical components and the heat dissipative non-optical components are respectively mounted on different sides of the plate or are respectively arranged in different compartments on one side of the plate.

4. The gas-cooled laser device of claim 1, wherein the ventilation channels of the housing walls are formed by a series of parallel channels.

5. The gas-cooled laser device of claim 1, wherein the ventilation channels have a geometry such that a gas flow passing through them reaches its maximum flow velocity in the region of the plate.

6. The gas-cooled laser device of claim 1, wherein the plate and the housing walls provided with ventilation channels are connected together with a material fit.

7. The gas-cooled laser device of claim 1, wherein the plate and the housing walls provided with ventilation channels are manufactured out of one piece of heat conducting material.

8. The gas-cooled laser device of claim 1, wherein the plate and the housing walls opposite each other form an H or a U-shaped cross-section.

9. The gas-cooled laser device of claim 1, wherein the plate is at least as thick as the housing walls provided with ventilation channels.

10. The gas-cooled laser device of claim 1, wherein the ventilation channels of the housing walls are connected to a fan through at least one distribution channel extending transversely to the ventilation channels.

11. The gas-cooled laser device of claim 1, further comprising a fan to which the ventilation channels are fluidly connected.

12. The gas-cooled laser device of claim 1, wherein the heat conducting material of the plate is a metal.

13. The gas-cooled laser device of claim 1, wherein the heat dissipative optical components are directly mounted on the plate of the heat conducting material.

14. The gas-cooled laser device of claim 1, wherein the plate is free of ventilation channels.

15. The gas-cooled laser device of claim 3, wherein the heat dissipative optical components and the heat dissipative non-optical components are directly mounted on the plate of the heat conducting material.

16. A method of cooling a laser device, the method comprising:
providing a first heat conducting housing wall with first ventilation channels that extend within the first heat conducting housing wall, each of the first ventilation channels having a length that is greater than the thickness of the first heat conducting housing wall;
providing a second heat conducting housing wall with second ventilation channels that extend within the second heat conducting housing wall, each of the second ventilation channels having a length that is greater than the thickness of the second heat conducting housing wall;
directly mounting at least one heat dissipative optical component and at least one heat dissipative non-optical component on opposite sides of a plate made of a heat conducting material that is arranged between the first and second heat conducting housing walls such that heat from the components dissipates into the heat conducting plate; and
directly connecting in a thermally conductive manner the heat conducting plate with the first and second heat conducting housing walls such that the heat from the at least one heat dissipative optical component and the at least one heat dissipative non-optical component is directed away from the heat conducting plate, through the first and second heat conducting housing walls, and through the first and second ventilation channels, respectively.

\* \* \* \* \*

UNITED STATES PATENT AND TRADEMARK OFFICE
CERTIFICATE OF CORRECTION

| | |
|---|---|
| PATENT NO. | : 8,179,936 B2 |
| APPLICATION NO. | : 12/138932 |
| DATED | : May 15, 2012 |
| INVENTOR(S) | : Dirk Bueche et al. |

It is certified that error appears in the above-identified patent and that said Letters Patent is hereby corrected as shown below:

Column 6, line 32 (Claim 1, line 22) delete "walls" and insert --walls,--.

Signed and Sealed this
Thirty-first Day of July, 2012

David J. Kappos
*Director of the United States Patent and Trademark Office*